United States Patent [19]

Bening et al.

[11] Patent Number: 5,669,212
[45] Date of Patent: Sep. 23, 1997

[54] AUXILIARY BLOWER FOR MOWER DECK

[75] Inventors: Curtis Reinhard Bening, Burnett, Wis.; Harlin James Trefz, Jackson, Tenn.

[73] Assignee: Deere & Company, Moline, Ill.

[21] Appl. No.: 605,236

[22] Filed: Feb. 2, 1996

[51] Int. Cl.⁶ .................................................. A01D 34/70
[52] U.S. Cl. ............................ 56/13.3; 56/16.9; 56/202
[58] Field of Search ........................ 15/328; 56/13.3, 56/13.4, 16.6, 16.9, 202, 243, 320.1, 320.2, DIG. 9

[56] References Cited

U.S. PATENT DOCUMENTS

| | | | |
|---|---|---|---|
| 2,856,785 | 10/1958 | Steel | 74/242.8 |
| 4,403,433 | 9/1983 | Smith | 56/16.9 X |
| 4,693,063 | 9/1987 | Hoepfner | 56/16.6 |
| 4,735,037 | 4/1988 | Benter | 56/13.3 |
| 4,996,829 | 3/1991 | Saitoh et al. | 56/13.3 |
| 5,018,344 | 5/1991 | Samejima et al. | 56/13.3 |
| 5,142,852 | 9/1992 | Nelson | 56/202 X |
| 5,240,461 | 8/1993 | Hohnl | 474/101 |
| 5,254,046 | 10/1993 | Hohnl | 474/101 |
| 5,560,188 | 10/1996 | Murakawa et al. | 56/13.3 |

OTHER PUBLICATIONS

See attached related patent application and remarks referring to that patent application.

Primary Examiner—Terry Lee Melius
Assistant Examiner—Robert Pezzuto

[57] ABSTRACT

A belt driven auxiliary blower is provided for use with rotary mower decks used in wet and difficult cutting conditions. The blower is pivotally and slidably attachable to the deck for ease of installation and removal. It includes a quick release latch mechanism that allows it to swing open for cleanout or service. A lockable tensioner is provided that permits clean out of the impeller, quick replacement of the belt or removal of the blower when its use is not desired. The blower impeller also rotates in a direction that complements the flow of the cut material being discharged to minimize blockages in the impeller chamber.

9 Claims, 8 Drawing Sheets

AUXILIARY BLOWER FOR MOWER DECK

1. FIELD OF THE INVENTION

The present invention relates to auxiliary blowers utilized to propel cut grass and similar vegetation from a mower deck and to a collection receptacle such as a bagger. More specifically, it relates to a belt driven blower which is swingably mounted with the mower deck for easy clean-out and equipped with a belt tensioning release mechanism that permits quick and easy replacement or removal of the belt or removal of the blower from the deck.

2. BACKGROUND OF THE INVENTION

Mowers used for cutting grass and similar vegetation are often used in conjunction with auxiliary blowers that propel material cut by the mower deck through a discharge duct and into a material collection device.

When wet or long grass or other vegetation is being cut, it can sometimes become difficult to propel the material. Accordingly, the blower or discharge duct frequently becomes blocked and the operator must stop, uncouple the blower and/or duct work, and remove the material. Should the material continue to accumulate and cause blockages, use of the blower must then be discontinued so that the material can be distributed over the ground.

SUMMARY OF THE INVENTION

It would therefore be desirable to provide an auxiliary blower which could be utilized in wet and/or long grass or other vegetation and one which could also be quickly and easily cleared of blocked material when necessary or removed should conditions become so difficult that the material cannot be propelled.

Towards these goals there is provided a detachable auxiliary blower which is slidably and removably mountable on a pivot rod carried on the deck. The blower has a hand activated latch that permits it to be swung open about the pivot rod to allow quick and easy clean-out of the impeller chamber.

Additionally, a latch mechanism is provided on the belt-driven blower that allows the operator to quickly release the drive belt tension so that the impeller will not be driven when the blower is cleaned out. The tension release also permits the belt to be removed or replaced and the blower to be removed from the deck when the operator does not want to utilize the blower and collection device.

The blower also has an impeller that rotates to assist the flow of the cut material being discharged rather than deflect or significantly change its direction.

A baffle is mounted between the discharge opening of the deck and the blower intake opening to provide a smooth wall surface for the flow path of the material as it leaves the deck and enters the blower, thereby further minimizing the likelihood of blockages caused by protruding deck or blower surfaces.

DESCRIPTION OF THE PREFERRED EMBODIMENT

Figure 1:
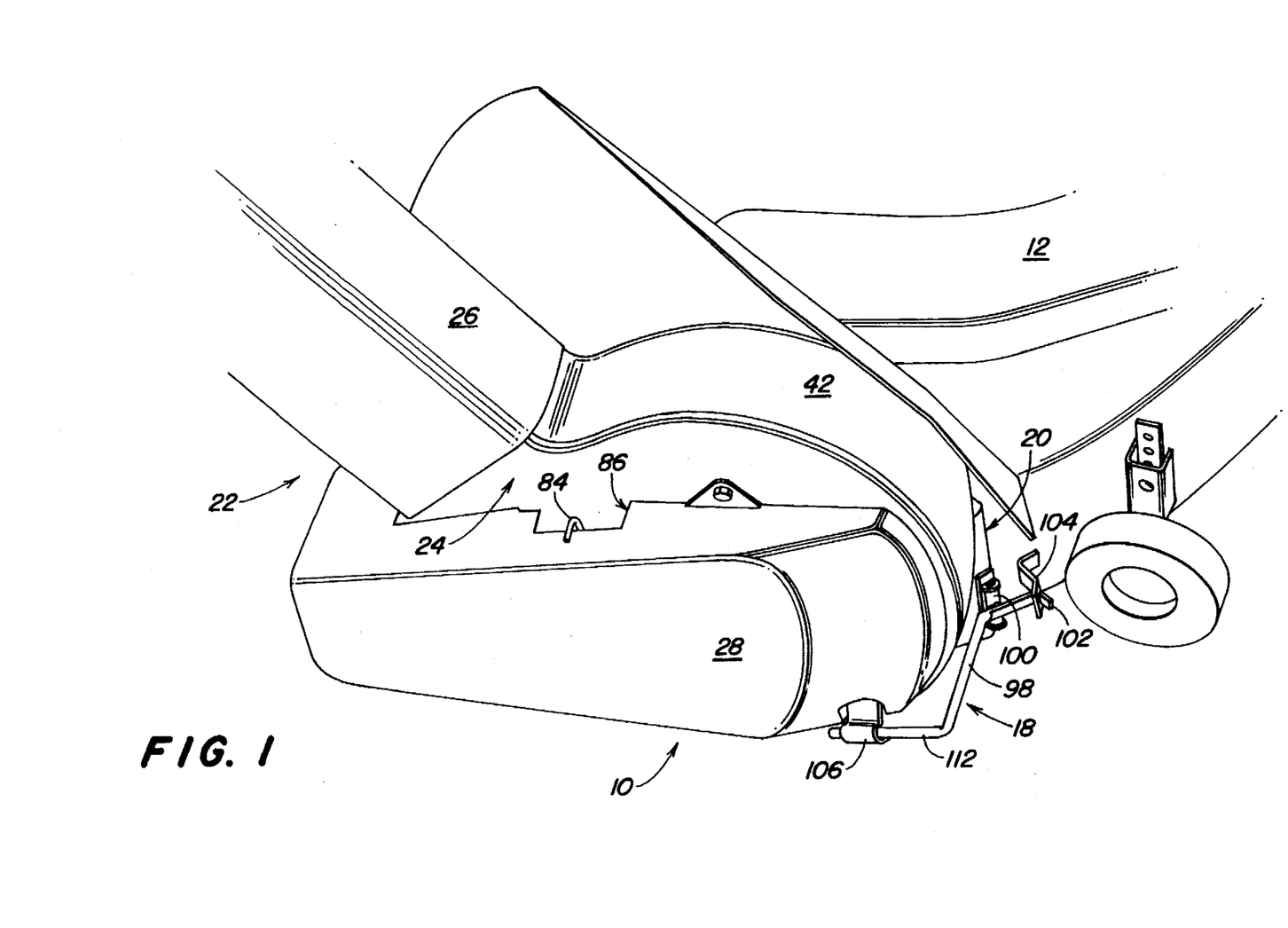
FIG. 1 illustrates a front elevated perspective view of the auxiliary blower coupled with the mower deck.
Figure 2:
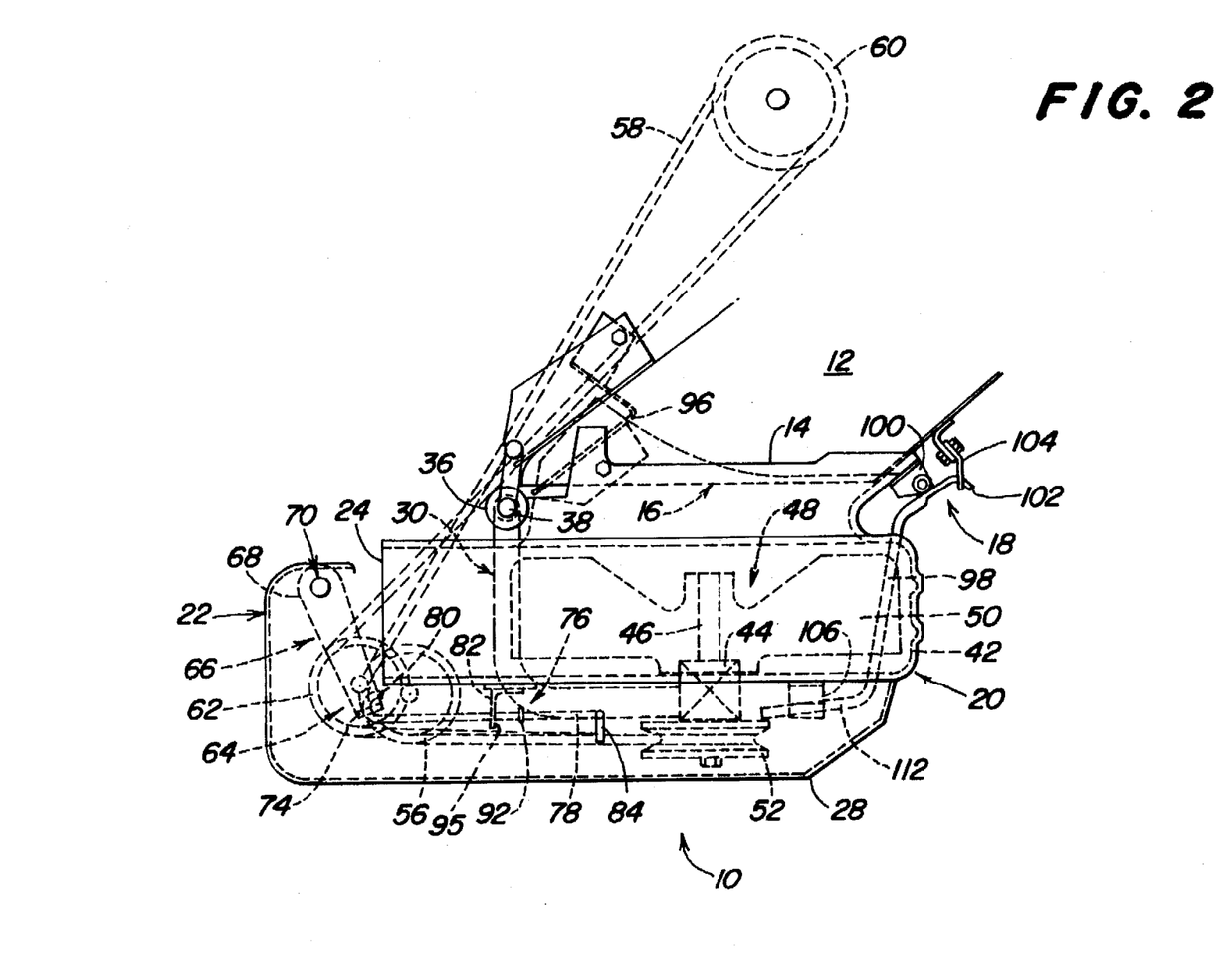
FIG. 2 illustrates a top schematic view of the blower in its operative position with the belt tensioned.

Looking first to FIGS. 1 and 2 there is shown a perspective view of the auxiliary blower attachment 10 mounted with a mower deck 12. The inlet opening 14 of the blower 10 is mounted to the outlet opening 16 of the mower deck 12, which in turn, would typically be propelled by a tractor or similar type of vehicle.

The blower 10 is adapted to be removably coupled with the mower deck 12 and includes a latch mechanism 18 at its forward end portion 20 that releasably locks it to the deck 12. The blower 10 includes at its rearward portion 22 an outlet opening 24 which is coupled with a discharge duct 26 that is utilized to convey material propelled by the blower 10 to a material collection device propelled by the tractor. The blower 10 is equipped with a removable shield or cover 28 on its outer face that encloses and guards the belt drive components utilized to power the blower 10.

Figures 3, 4:
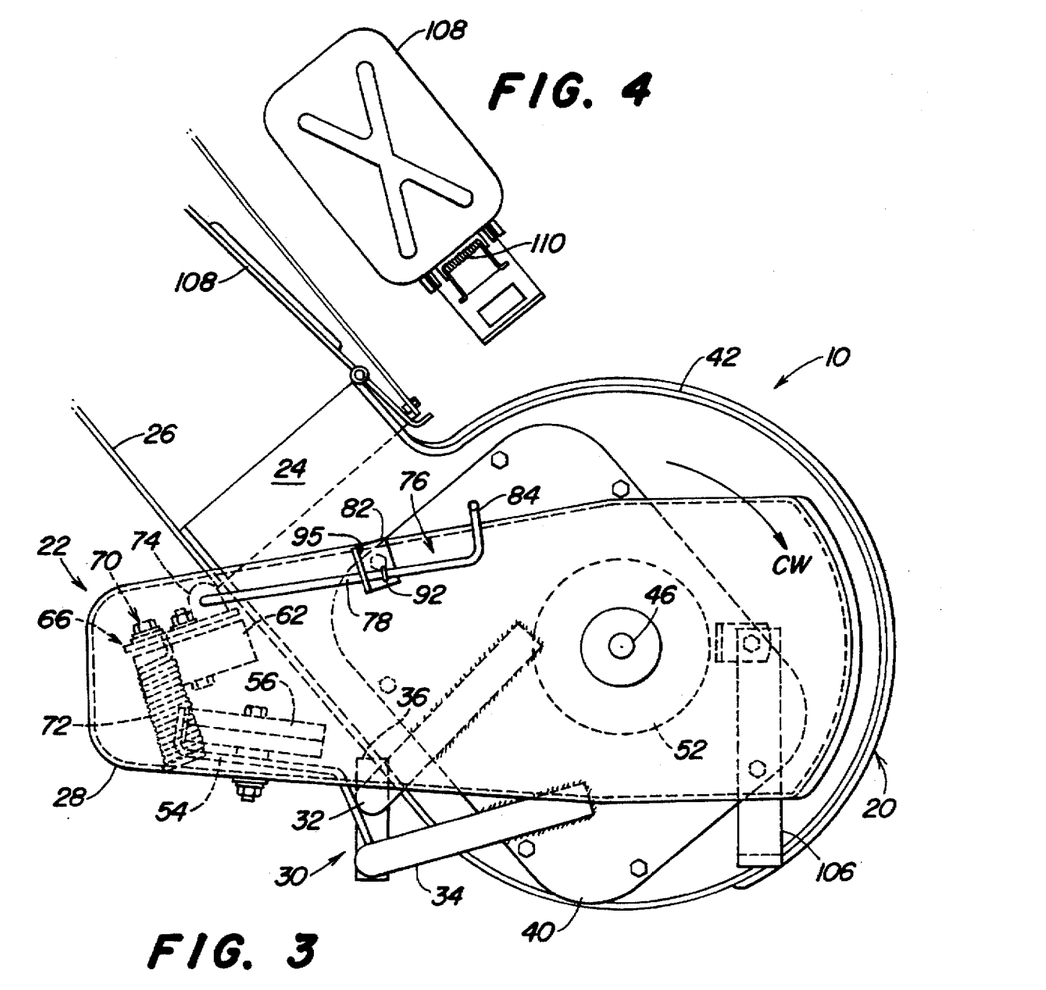
FIG. 3 illustrates a schematic side view of the blower.
FIG. 4 illustrates a top view of the door carried at the blower outlet.

Looking now to FIGS. 2 and 3 which show schematic top and side views of the blower 10, there is shown an L-shaped frame member 30 which includes two support legs 32 and 34 and a sleeve mounting 36 which can be slidably received on a pivot or support rod 38 carried by the deck 12. The L-shaped frame 30 supports a plate 40 which in turn carries the plastic housing 42 of the blower 10.

The plate 40 carries a bearing support 44 for an impeller shaft 46 which extends into the impeller chamber 48. The shaft 46 carries an impeller 50 inside the chamber 48 and a pulley 52 on the outside of the chamber 48.

As shown in FIG. 3 the L-shaped frame 30 further carries a bracket 54 that supports a directional pulley 56 utilized to change the direction of the belt means 58 as it moves from the drive pulley 60 carried on the mower deck 12 and to the impeller drive pulley 52.

A tensioning or idler pulley or 62 is supported at the outer end of the bracket 54. This pulley 62 is carried on one end portion 64 of a lever means 66 that has its other end portion 68 secured to a pivot means 70 carried by the bracket 54. The lever means 66 is biased by the spring 72 in a clockwise direction, as viewed in FIG. 2, to urge the tensioning pulley 62 clockwise about the axis through the pivot 70.

Figures 8, 9, 10:
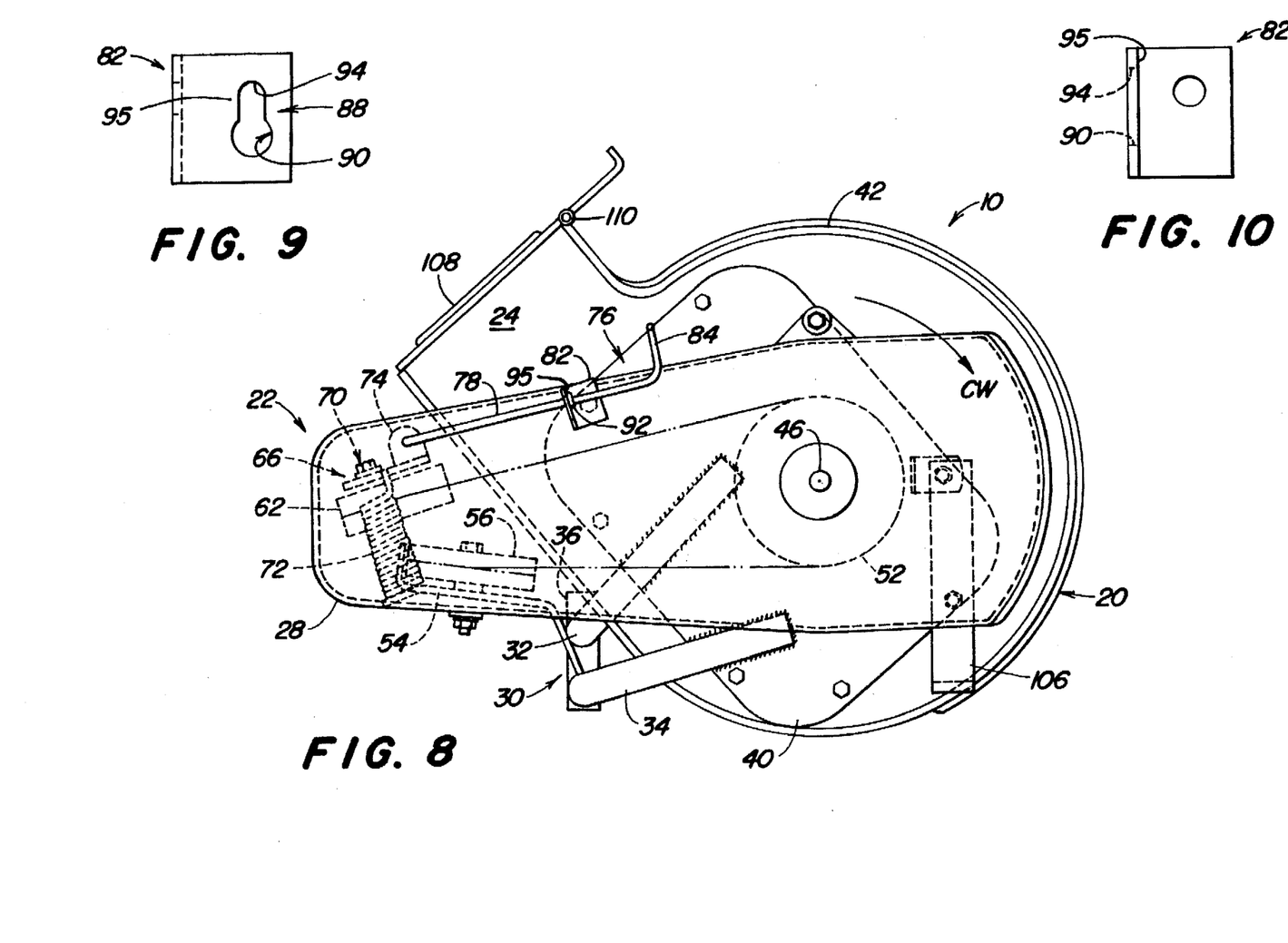
FIG. 8 illustrates a schematic side view of the blower in the opened position with the belt untensioned.
FIG. 9 illustrates the latch bracket utilized to secure the idler pulley latch rod in either a tensioned or untensioned condition.
FIG. 10 illustrates a side view of the latch bracket shown in FIG. 9.

The lever means 66 carries at its one end portion 64 an upstanding ear 74 having an opening through it. A shifting means 76 including an elongated rod 78 has a hook 80 at one end which is secured in the ear 74. The middle portion of the rod 78 is slidably supported in a slotted bracket 82 and includes an upstanding handle 84 at its other end which projects upwardly and out of the opening 86 in the guard 28 (See FIG. 1). The bracket 82, as is best shown in FIGS. 9 and 10, includes a slot 88 which is provided with an enlarged area 90. The rod 78 includes a stop 92 secured around its circumference. This stop 92 has a diameter which is greater than the width of the top portion 94 of the slot 88.

As further shown in FIG. 2, a baffle 96 is secured to the mower deck 12 at its opening 16 to provide a smooth wall surface for the flow of the cut material being propelled by the mower blade through the deck outlet opening 16 and into the blower inlet opening 14.

Figure 5:
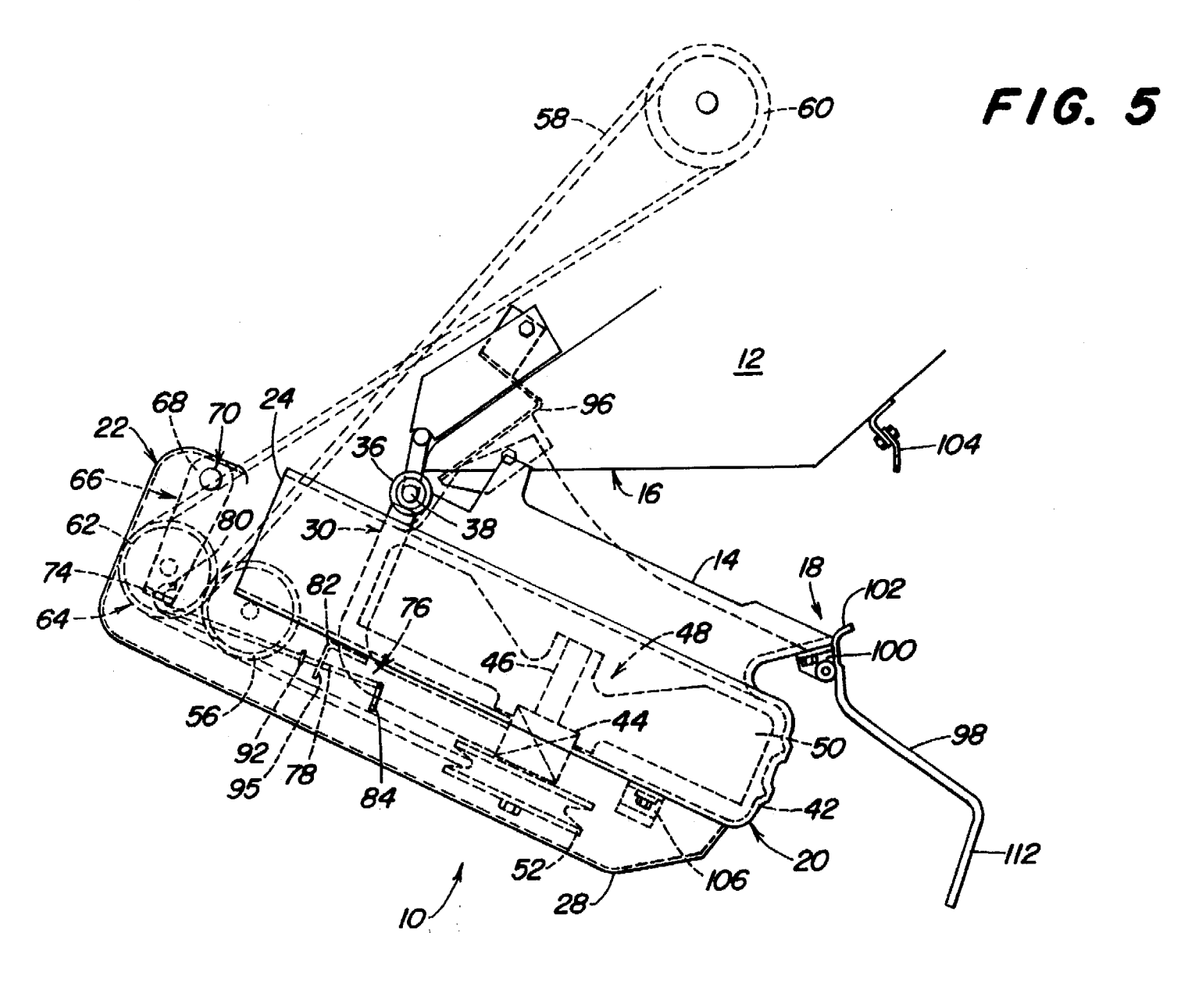
FIG. 5 illustrates a schematic top view of the blower swung open to allow clean-out of the impeller chamber.
Figure 7:
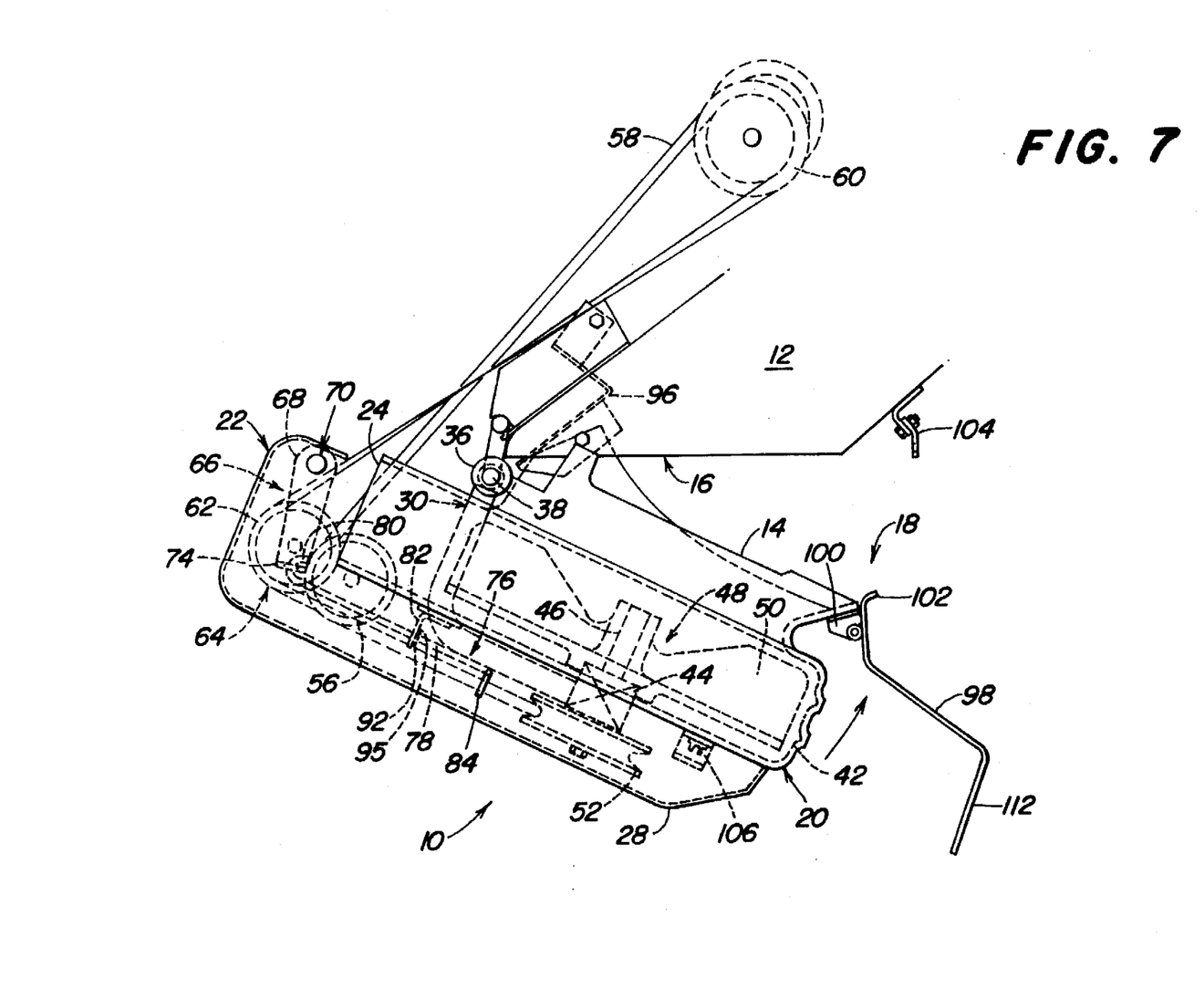
FIG. 7 illustrates a schematic top view of the blower in its opened position with the drive belt in the untensioned position.

The blower 10 is further provided with the latching means or mechanism 18 at its forward end portion 20 which takes the form in the preferred embodiment of a strap 98 of bent metal. As shown in FIGS. 2, 5 and 7, the strap 98 is pivotally secured to the blower 10 at 100 and includes at its one end a hooked portion 102 which is adapted to be received in an opening in a tab 104 carried on the mower deck 12. Since the strap 98 is relatively thin, it is resilient enough to be pushed downward and locked in place under the catch 106 carried on the blower housing 42.

Looking again to the views illustrated in FIGS. 3 and 4, it is seen that the blower 10 further includes a safety door or flap 108 which is pivotally secured to the outlet opening 24 of the blower 10. This door 108 is rigid and includes a spring 110 that urges it toward a closed position as shown in FIG. 8 when the ductwork 26 is not coupled to the blower 10. As shown in FIG. 3, the door 108 is pivoted to its open position within the blower ductwork 26 when the duct 26 is mated to the outlet opening 24 of the blower 10.

Turning now to the operation of the auxiliary blower and FIG. 1, we see that the blower 10 in its operative configuration is secured to the outlet opening 16 of the mower deck 12. The blower 10 is coupled with the duct 26 which would lead to a collecting device so that cut material can be propelled into that collection device. At its forward end portion 20, the blower 10 is secured to the deck 12 by the latching mechanism 18.

FIGS. 2 and 3 illustrate in schematic form the blower 10 in its operative configuration as mounted with the mower deck 12. In this configuration, material cut by the blades of the mower deck 12 would be propelled through the outlet opening 16 of the mower deck 12 and into the inlet opening 14 of the blower 10. This material would then enter the impeller chamber 48 of the blower 10 where the clockwise rotation of the blades of the impeller 50, as viewed in FIG. 3, would compliment the movement of the cut grass coming out of the mower deck 12 and direct it up in through the outlet 24 of the blower housing 42. Since the impeller 50 rotates in this direction, the impeller blades work with the flow of the material rather than diverting or deflecting the flow.

The impeller 50 is driven by the drive pulley 60 carried on top of the mower deck 12. The endless belt 58 is entrained around the drive pulley 60 and the directional pulley 56 carried at the rear end portion 22 of the blower housing 42, then around the impeller pulley 52 and to the idler pulley 62 before returning to the mower deck drive pulley 60.

Providing tension on the belt 58 to assure that the belt 58 drivingly powers the impeller 50, is the spring loaded idler pulley 62 carried on the lever means 66. The lever means 66 is urged by the spring 72 in a clockwise direction, as shown in FIGS. 2, 5 and 7 to maintain tension on the belt 58 during its operation. When the blower 10 is coupled with the deck 12, the rod 78 is slidably resting within the lower, larger opening 90 of the bracket 82 with the abutment surface surface 92 positioned to the one side of the opening 88 as is shown in FIGS. 2 and 3.

Figure 6:
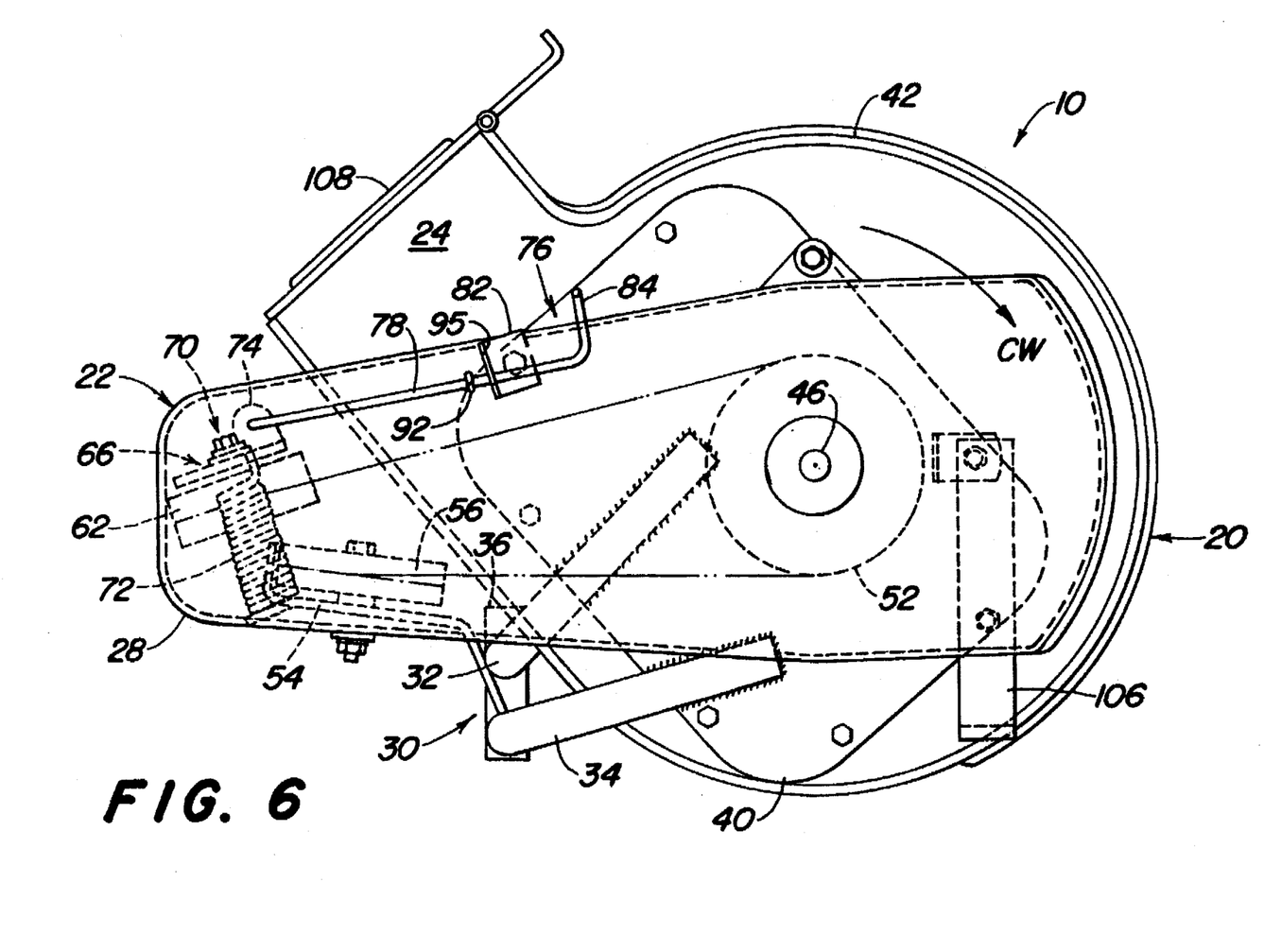
FIG. 6 illustrates a schematic side view of the blower in the opened position with the belt under tension.

Should the operator encounter wet or long grass or other conditions which might contribute to a blockage in the flow of material through the blower 10, the blower 10 could be opened to the position illustrated in FIGS. 5 and 6. To open the blower 10, the resilient end 112 of the latch strap 98 is pushed in towards the housing 42 and moved down to release it from under the catch 106. The latch strap 98 is then pivotally moved from the position shown in FIG. 2 to that shown in FIG. 5 and the hooked end of the latch strap 98 will slide out of the opening in the tab 104 on the mower deck 12. The forward end portion 20 of the blower 10 is then swung out as the blower 10 rotates about the pivot rod 38 to allow the operator to access the impeller chamber 48 of the blower 10 and the outlet opening 16 of the deck 12.

If the equipment being operated is provided with a means to assure that the operation of the drive pulley 60 is discontinued when the operator dismounts the tractor, the operator need not release the tension on the belt 58 during the cleanout activity. Under these conditions, the blower 10 and its drive components will be as shown in FIGS. 5 and 6. Should the operator want to disengage the belt tension when he opens the blower 10 for cleanout, he would first move the elongated latch rod 78 upwardly from the position shown in FIG. 3. As the blower 10 is swung open, the spring 72 biasing the lever means 66 clockwise will pull the stop 92 on the rod 78 into abutment with the bracket 82, as shown in FIGS. 7 and 8. Since the rod 78 is coupled with the spring loaded lever means 66, the rod 78 would be biased against the bracket 82 and retain the lever means 66 in the position shown in FIG. 7 to allow the belt 58 to become slack when the blower 10 is opened. Should the operator want to untension the belt 58 after the blower 10 has been opened, he can move the handle 84 to move the rod 78 from the position shown in FIG. 6 to that shown in FIG. 8 by pulling the stop 92 through the large opening 90 in the bracket (See FIG. 9) and shifting it upwardly so that the rod 78 is positioned in the thinner portion 94 of the slot 88. The spring pressure on the lever means 66 will then urge the abutment 92 on the rod 78 into engagement stop surface the bracket 82, as shown in FIGS. 7 and 8.

Figures 2A, 5A:
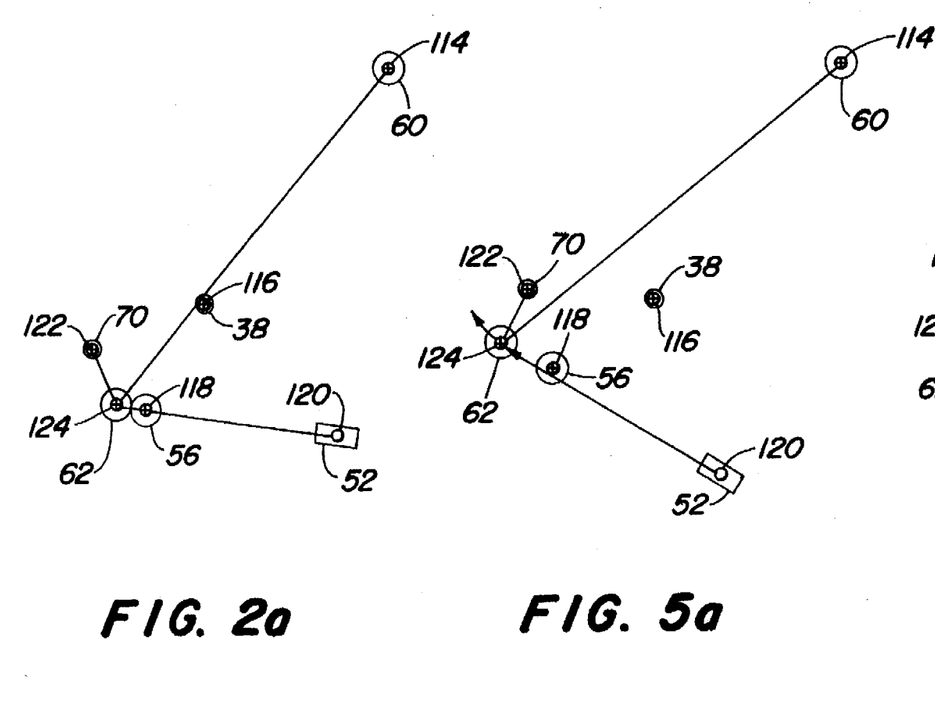
FIG. 2a depicts the pivot axes for the belt drive components when positioned as shown in FIG. 2.
FIG. 5a depicts the pivot axes for the belt drive components when positioned as shown in FIG. 5.
Figure 7A:
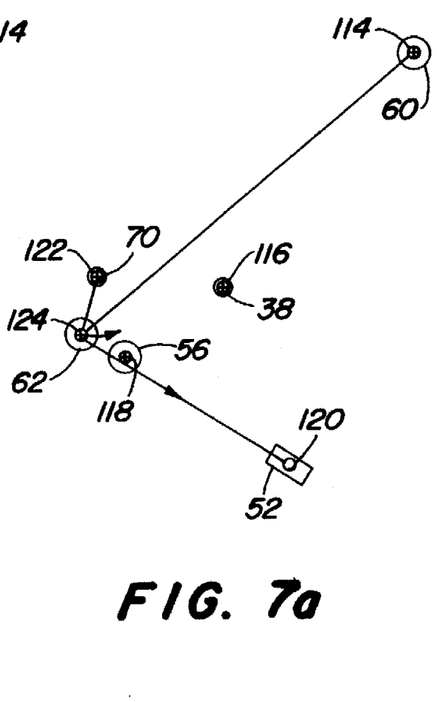
FIG. 7a depicts the pivot axis for the drive components as positioned as shown FIG. 7.

FIGS. 2a, 5a, and 7a illustrate the positions of the axes of the drive pulley 60, directional pulley 56, impeller pulley 52, idler pulley 62 lever means, pivot 70 and blower pivot mount 38 for the blower orientations shown respectively in FIGS. 2, 5 and 7. This series of FIGS., 2a, 5a and 7a are intended to illustrate the placement of the belt drive components relative to one another as the tensioning mechanism is operated. As identified in FIGS. 2a, 5a and 7a, 114 depicts the axis of rotation of the drive pulley 60, 116 depicts the axis of rotation for the blower mounting pivot rod 38, 118 depicts the axis of rotation of directional pulley 56, 120 depicts the axis of rotation for the impeller pulley 52, 122 depicts the pivot axis for the lever pivot means 70 swings, and 124 depicts the axis of rotation for the tensioning pulley 62.

As is shown by FIGS. 2a, 5a, and 7a, it is the movement of the tensioning pulley 62 relative to the drive and impeller pulleys 60 and 52 that serves to tension or untension the belt 58 in either the closed and operative blower position or the opened cleanout position.

Looking first to FIG. 2a, it is seen that the idler axis of rotation 124 is located at approximately a 5:00 o'clock position relative to the axis of rotation 122 of the pivot means 70. In this position, the belt 58 is tensioned and the blower 10 is closed. As the blower 10 is opened to allow cleanout, the axes move to the positions shown in FIG. 5a. In this orientation, the axis 124 of idler pulley 62 has been urged by the spring 72 to a 7:00 o'clock position where it has been moved away from both the drive pulley axis 114 and impeller axis 120 to maintain belt tension.

If the operator wants to untension the belt 58 while the blower 10 is opened, he can move the axis 124 of the tensioning pulley 62 by shifting the lever means 66 and the axis 124 to the 6:30 o'clock orientation shown in FIG. 7a. This shifts the tensioning pulley 124 closer to both the impeller pulley axis 120 and drive pulley axis 114 to allow untensioning and removal of the belt 58 or blower 10 if desired.

With the present invention there is provided an auxiliary blower that is usable with a mower deck in conditions where wet and/or long grass or other vegetation make blockages in the flow path likely. The baffle provides a smooth surface for the material flow path to minimize accumulations of material on protruding portions of the deck or blower structure. Rotation of the impeller in a forwardly direction at its top portion compliments the direction of flow of the cut grass as it comes out of outlet opening and enhances its movement it as it is directed up and out the outlet of the housing. The blower is pivotally mounted with the deck and provided with a quick release latch at its forward end to facilitate easy and quick opening of the blower for cleanout should blockages occur. The belt tensioning quick release allows the operator to swing the idler pulley in a counterclockwise fashion against the spring bias and release tension should he wish to disengage the belt during the cleanout activity. Further the belt tensioning release permits the operator to provide enough slack in the belt to remove the belt from the drive pulley on the mower should he want to change belts and/or remove the belt and blower from the deck. The pivot support on the blower takes the form of a sleeve that can be slidably received on the upstanding rod carried by the deck to allow quick and easy installation or removal of the blower.

I claim:

1. A blower attachment usable with a mower deck having a drive pulley and an outlet opening;

the attachment including a housing with inlet and outlet openings;

means mounting the housing on the deck for swingable movement between a first position adjacent the deck wherein the inlet opening is adjacent to the outlet opening of the mower deck and a second position wherein one end portion of the housing is swung away from the mower deck to separate the inlet opening from the outlet opening of the deck;

an impeller rotatably carried in the housing and drivingly coupled with an impeller pulley, said impeller adapted to propel material ejected through the deck outlet opening and received in the inlet opening of the housing to and through the outlet opening of the housing;

a directional pulley carried by the housing;

pivot means carried on the housing;

a tensioning pulley;

belt means entrained around the drive, directional, impeller and tensioning pulleys;

lever means having first and second end portions, one end portion being carried by the pivot means and the second end portion carrying the tensioning pulley, said second end portion of the lever means being movable between a first position where the tensioning pulley is spaced from the drive pulley and a second position where the tensioning pulley is closer to the drive pulley;

biasing means urging the second end portion of the lever means away from the drive pulley;

shifting means carried on the housing and coupled with the lever means, the shifting means being selectively movable between first and second positions as the shifting means moves the second end portion of the lever means between its respective first and second positions, and locking means operatively coupled with the shifting means for retaining said shifting means and second end portion of the lever means in their respective first or second positions.

2. The invention defined in claim 1 wherein the second end portion of the lever means is shiftable between its first and second positions when the housing is swung away from the deck.

3. The invention defined in claim 1 wherein the means mounting the housing on the deck includes an upstanding pivot rod secured with the deck and a sleeve carried on the housing that is adapted to be slidably and removably received on the rod.

4. The invention defined in claim 3 wherein the housing includes forward and rearward portions and the sleeve is carried on the rearward portion.

5. The invention defined in claim 1 wherein the direction of rotation of the impeller, as viewed from the inlet opening of the housing, is counterclockwise.

6. The invention defined in claim 1 wherein the housing includes a stop surface, the shifting means includes a rod which is coupled with the lever means and the rod has an abutment surface which is releasably engagable with the stop surface.

7. The invention defined in claim 6 wherein the abutment surface can be engaged with the stop surface when the lever means is in its second position.

8. The invention defined in claim 1 wherein the shifting means will permit movement of the second end portion of the lever means and the tensioning pulley towards the drive pulley and the belt means to be untensioned when the housing is adjacent to the deck.

9. A blower attachment usable with a mower deck having a drive pulley and an outlet opening;

the attachment including a housing with inlet and outlet openings;

means mounting the housing on the deck for swingable movement between a first position adjacent the deck wherein the inlet opening is adjacent to the outlet opening of the mower deck and a second position wherein one end portion of the housing is swung away from the mower deck to separate the inlet opening from the outlet opening of the deck;

an impeller rotatably carried in the housing and drivingly coupled with an impeller pulley, said impeller adapted to propel material ejected through the deck outlet opening and received in the inlet opening of the housing to and through the outlet opening of the housing;

a directional pulley carried by the housing;

pivot means carried on the housing;

a tensioning pulley;

belt means entrained around the drive, directional, impeller and tensioning pulleys;

lever means having first and second end portions, one end portion being carried by the pivot means and the second end portion carrying the tensioning pulley, said second end portion of the lever means being movable between a first position when the housing is adjacent to the deck and the tensioning pulley is spaced from the drive and impeller pulleys to a second position when the housing is swung away from the deck and the tensioning pulley is closer to the drive and impeller pulleys;

biasing means urging the second end of the lever means towards its position spaced from the drive and impeller pulleys;

shifting means carried on the housing and coupled with the second end portion of the lever means, the shifting means being movable between first and second positions as it moves the second end portion of the lever means between its respective first and second positions, and locking means operatively coupled with the shifting means for retaining said shifting means and second end portion of the lever means in their respective first or second positions.

* * * * *